United States Patent Office 2,891,452
Patented June 23, 1959

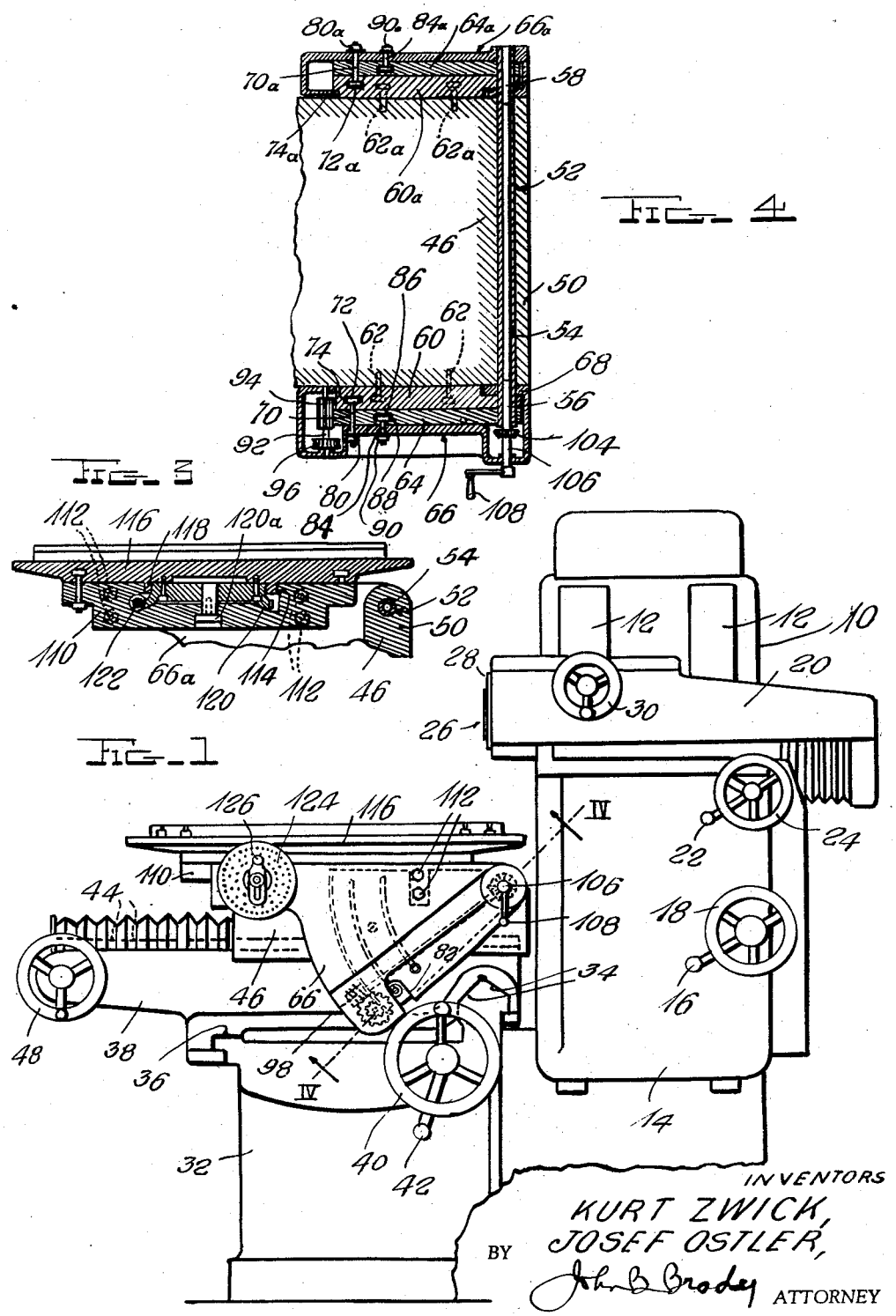

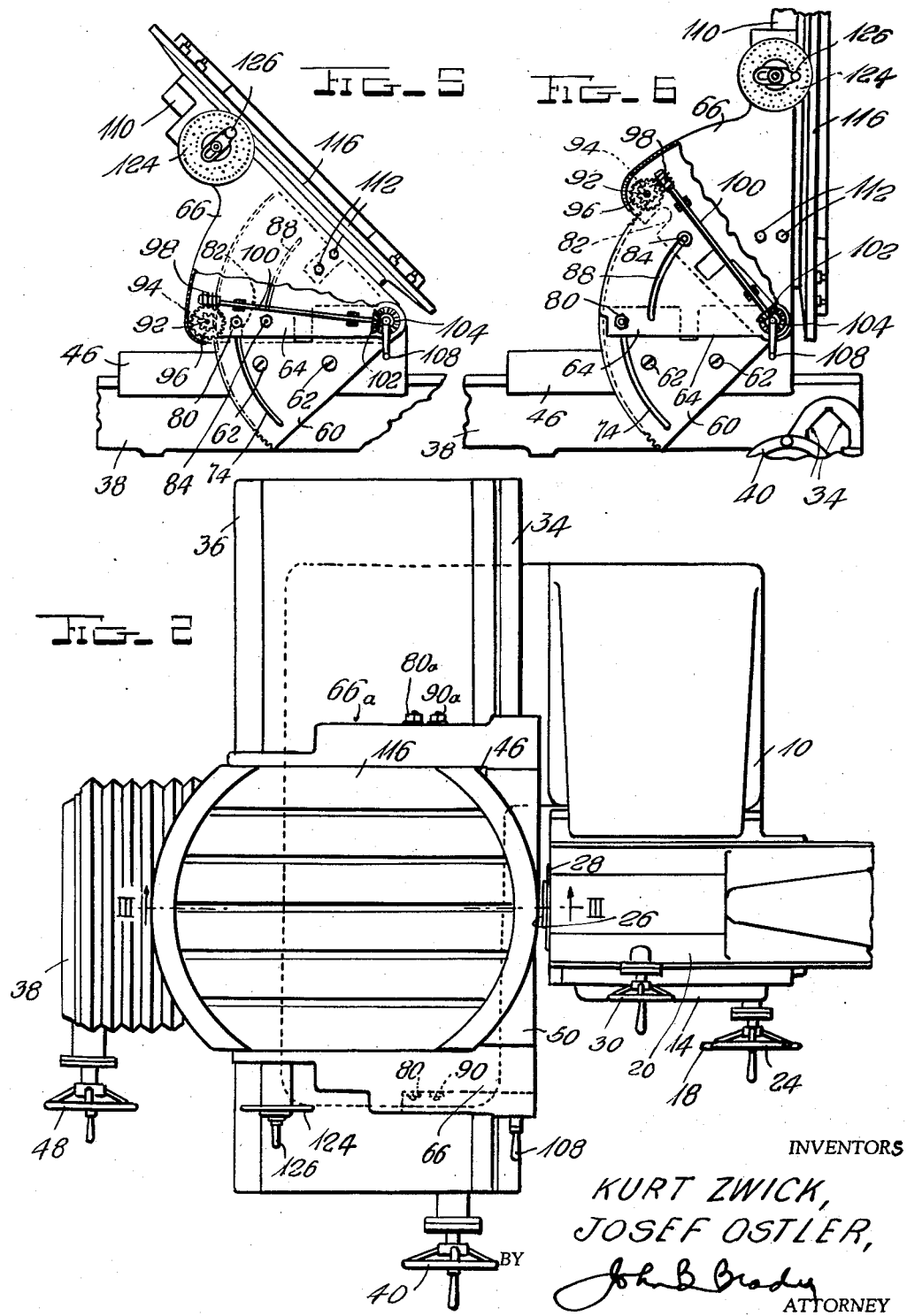

2,891,452
HORIZONTAL BORING AND/OR MILLING MACHINE

Kurt Zwick and Josef Ostler, Munich, Germany, assignors to Hans Deckel, Munich-Solln, Germany, and Friedrich Wilhelm Deckel, Zug, Switzerland Application February 14, 1955, Serial No. 487,974

Claims priority, application Germany February 22, 1954

6 Claims. (Cl. 90—58)

The present invention relates broadly to horizontal boring and/or milling machines and, more particularly, to machines of this type which comprise a work clamping table which forms an integral part of the machine and for which adjusting means are provided by which said work clamping table can be rectilinearly adjusted in two co-ordinate directions, said work clamping table being further adapted to be tiltable about a tilting axis carried by said adjusting means.

In the case of machines of the type indicated and having a work clamping table which forms an integral part of the machine, i.e. which is not removable from the machine, it has already been proposed to provide for the work clamping table to be tilted, together with part of its adjusting means, for example together with its upper slide, in relation to its lower slide. This arrangement has, however, a drawback in that in many cases the range of movement of the work table adjusting means is seriously restricted when the said table has been tilted. Moreover, the weight of the parts which during tilting are moved together with said work table imposes an unnecessary and undesirable load on the pivots of the work table and renders it more difficult to change the position of said table.

In heretofore known machines of the type indicated use has been made, where necessary, of a separate supplementary work table adapted to be mounted on the work table of the machine and having a work clamping plate which is capable of being tilted about at least one axis and of being swivelled about at least one additional axis. Since this supplementary work table has no adjusting means of its own, it does not give rise to the hereinbefore mentioned disadvantages, but this arrangement introduces other inherent limitations: Firstly, the tilting axle of said supplementary work table in most cases has only one laterally disposed bearing which cannot satisfactorily be designed to withstand the heavy loads it should be capable of absorbing; secondly, both the tilting and the swivelling ranges of the supplementary work table are seriously limited, since the work clamping table of the machine by which the supplementary work table is supported does not permit the latter to be universally adjusted.

It is one object of the present invention to eliminate the disadvantages of heretofore known arrangements and to provide for a machine of the type indicated a work clamping table which, while affording wide tilting and swivelling ranges, and while being of sturdy construction, especally as regards its bearings, is easy and convenient to operate.

The hereinbefore mentioned purposes are achieved according to the invention by providing a work clamping table which is adapted to be tilted, independently of and without its adjusting means, about an axis extending transversely of the spindle which carries the cutting tool.

The individual features of the invention are set forth in the following specification by reference to the accompanying drawings, in which:

Fig. 1 is a front elevational view of the machine of the invention;

Fig. 2 is a plan view of the machine;

Fig. 3 is a fragmentary cross-sectional view taken along the line III—III in Fig. 2;

Fig. 4 is a fragmentary cross-sectional view taken along the line IV—IV in Fig. 1; and Figs. 5 and 6 illustrate two different tilted positions of the work clamping table.

Referring now to the drawings, the machine comprises a vertical stand or column 10 which is provided with vertical guide ways 12 along which a gearbox 14 is vertically adjustable, said gearbox accommodating the drive and control means not only for the vertical adjustment of the gearbox itself, but also for the spindle and the work supporting arrangement to be described. The desired movements of the gearbox are produced either by power means controlled by a control lever 16 or by manual rotation of a hand wheel 18 which co-operates with suitable mechanism.

A spindle carrier or headstock 20 is arranged for longitudinal movement in horizontal guide ways provided on top of the gearbox 14. The position of the headstock may be changed either by power means controlled by a control lever 22 or by manual rotation of a hand wheel 24 co-operating with suitable mechanism. The tool spindle 26 is arranged longitudinally in relation to and within the headstock 20, the spindle being carried in a bearing bushing 28 which can be extended out of the headstock for a certain axial distance by rotation of a hand wheel 30 which co-operates with mechanism suitable for this purpose. As has already been mentioned, the spindle 26 is driven from the gear box 14 by way of suitable power transmission means (not shown).

Arranged adjacent the foot of the column 12 is a horizontal bed 32 extending transversely of the axis of the spindle, the upper portion of the bed being provided with guiding surfaces 34 and 36 the axes of which extend in a horizontal direction. The surfaces 34 and 36 of the bed 32 serve to guide a saddle member 38 for movement at right angles to the spindle axis. The position of the saddle 38 can be changed either by manual rotation of a hand wheel 40 co-operating with suitable mechanism or by drive means housed in the gear box 14, which drive means are controlled by a control lever 42.

Provided on the upper side of the saddle 38 are guide ways 44 which extend transversely of the longitudinal ways 34 and 36 and which serve to support a cross slide 46 the position of which in relation to the saddle can be changed by rotation of a hand wheel 48 co-operating with suitable mechanism. Thus, the cross slide 46, together with a work clamping table supported by the former in a manner to be described, can be shifted in relation to the spindle 26 in two mutually perpendicular directions by operation of mechanism controlled by hand wheels 40 and 48, respectively.

The cross slide 46 comprises an upwardly directed elongated projection or bearing bracket 50 with a horizontal bore 52 (Fig. 3) in which is rigidly mounted a bearing sleeve 54 the two ends of which project from the bracket 50 on either side to form two pivots 56 and 58 for the means by which the work clamping table can be tilted. These tilting means comprise a toothed segment 60 which is secured by two screws 62 to the front of the cross slide 46 in such a manner that the pivot 56 of the bearing sleeve 54 extends through a bore in the segment which is concentric with the toothed periphery of the latter. Also provided is a second toothed segment 64 which is pivoted in a similar manner about the pivot 56 and which can be rotated fan-fashion in relation to the toothed segment 60. Arranged in front of the toothed segment 64 is a substantially flat housing member 66 comprising a bearing flange 68 (Fig. 4) which is also mounted for rotation about the pivot 56.

The head 72 of a bolt 70 is inserted into an arcuate T-slot 74 provided in the toothed segment 60, the stem of said bolt extending through a hole in the toothed segment 64. Thus, any rotary movement of the toothed segment 64 in a vertical plane will cause the bolt 70 to move together with said segment and, in doing so, to cause its head 72 to slide along the arcuate T-slot 74 in the stationary toothed segment 60. It is, however, possible, by tightening the nut 80 provided on the bolt 70, to clamp the two toothed segments 60 and 64 firmly together. A recess 82 (Fig. 6) provided in the housing member 66 gives ready access to said nut 80.

Similarly, the head 86 of a second bolt 84 is engaged in an arcuate T-slot 88 in the toothed segment 64, the shank of the bolt 84 extending through a hole in the housing member 66. Again, it is possible, by tightening the nut 90 provided on the bolt 84, firmly to clamp together the toothed segment 64 and the housing member 66.

A shaft 92, which is parallel to the bearing sleeve 54, is supported for rotation within a compartment formed in the housing member 66. Fixedly mounted on the shaft 92 are a toothed pinion 94 and a worm wheel 96. As it is obvious from Fig. 6 the toothing of the segment 64 is partly cut off at its lower part. If the table is in its horizontal position, the pinion 94 merely meshes with the toothed periphery of segment 60. The pinion 94 meshes with the teeth of the segments 60 and 64, whereas the worm wheel 96 is in mesh with a worm 98 which is mounted on one end of a shaft 100 carried in bearings provided within the housing member 66. The opposite end of the shaft 100 carries a bevel gear 102 which cooperates with a bevel gear 104 mounted on the shaft 106 of a hand crank 108. The shaft 106 is carried in a bearing provided in the housing member 66 and in the bearing sleeve 54, respectively. Thus, any rotation imparted to the hand crank 108 will cause the parts 92 to 104 to be moved around, the pinion 94 rolling along the toothed periphery of the segment 60, to the upper end thus taking along the clamping plate 116 conjointly with the segments 66, 64 and 66a, 64a which are fastened to each other by nuts 90, 90a. The segment 64 with its screw 70 reaches the end of the circular or arcuate slot 74 in the segment 60. By tightening the screw nuts 80, 80a the segments 64, 64a will be fastened to the segments 60, 60a and the nuts 90, 90a will be loosened. By further turning the handle 108 the toothed pinion 94 meshes with the toothing of the fixed segment 64, thus when further turning the handle the position shown in Fig. 6 will be reached. By tightening the screw nuts 90, 90a, the segments 66, 66a can be secured with respect the segments 64, 64a. Thus by operating the handle 108 and by alternatively tightening and loosening the nuts 80, 80a or 90, 90a upward and downward swinging movements of the plates 64, 64a or 66, 66a around the axis of the bearing bushing 54 will be effected.

On the remote or rear side of the cross slide 46 a similar arrangement is provided, this arrangement comprising the segments 60a and 64a and a housing member 66a all of which are pivoted about the pivot 58 of the bearing sleeve 54. However, the segments 60a and 64a have no teeth, and the gearing 92 to 104 is not repeated in the housing member 66a, it being the only function of the arrangement just described to support the work clamping table.

Located between the two rockable housing members 66 and 66a and rigidly attached to them by screws 112 is a bridge-like supporting member 110 (Fig. 3) for the work clamping table. The supporting member 110 has at its centre a circular recess 114 which serves as a swivel mount for the work clamping plate 116 in which is formed a circular flange 118 which is guided for rotation by the circular recess 114. Rotation is transmitted to the work clamping plate 116 by a worm wheel 120 which is rigidly attached to the plate 116 within the circular flange 118 and which meshes with a worm 122 which is supported for rotation within the clamping plate supporting member 110 and to which rotation is imparted by means of an indexing head 124 operated by a crank 126.

When it is intended to tilt the work table 110, 116 about the axle 54 from its horizontal position as shown in Figs. 1, 2 and 3, it is necessary to slacken off the screws 70 and 70a and to tighten the screws 84 and 84a. Then, upon the hand crank 108 being rotated in the proper direction, the pinion 94 will roll along the toothed circumference of the stationary segment 60, causing the segments 64 and 64a as well as the housing members 66 and 66a, together with the supporting or bridge member 110 and the work clamping plate 116, to be tilted and to be finally brought into the 45° position shown in Fig. 5. Now, if it is intended still further to tilt the work clamping plate 116, it is necessary to tighten the screws 70 and 70a and to back off the screws 84 and 84a. This will cause the segments 64 and 64a to be clamped to the stationary segments 60 and 60a, respectively, and the pinion 94 will now continue to roll forward, but this time along the toothed circumference of the segment 64; it will be appreciated that during this additional tilting operation only the work table 110, 116 and the housing members 66 and 66a have a tilting motion imparted thereto, this being illustrated in Fig. 6.

It will be readily seen that the fan-like toothed segments give the work table a tilting range of between 0° and 90° without themselves occupying any major space. The rotary mounting of the work clamping plate 116 in the circular recess of the supporting member 110 permits the work piece to be swivelled in relation to said supporting member. This feature, in combination with the adjustment of the cross slide and the saddle in two mutually perpendicular directions and further with the adjustment of the spindle, makes it possible to design a machine which permits, for example, to present to the cutting tool any of the five exposed surfaces of a work piece of substantially cube shape without necessitating any reclamping or readjustment. It will also be appreciated that the work table is tilted independently of the means serving to adjust the table along two mutually perpendicular axes, i.e. independently of both the cross slide and the saddle, this making for maximum ease of operation and adjustment. Furthermore, the provision of bearings on either side of the work table and of massive supports produces an extremely sturdy construction of the adjustable work table.

While a preferred embodiment of the invention has been described herein, it will be understood that modifications may be made and that no limitations on the invention are intended other than may be imposed by the scope of the appended claims.

What is claimed as new and desired to be secured by Letters Patent of the United States, is as follows:

1. A machine tool having a base plate, a transverse shaft journaled transversely adjacent one end of said base plate, a first segment fastened to each side of said base plate and extending longitudinally of said base plate in planes normal to the plane of said base plate with the centers of said segments coincident with the axis of said shaft, a second segment disposed exteriorly of the aforementioned segment and overlapping therewith in a vertical plane adjacent the surface of the aforementioned segment, a third segment disposed adjacent said last mentioned segment and overlapping said last mentioned segment in a plane adjacent the surface of said second segment, said second and third segments having the centers thereof coincident with the centers of said first mentioned segments and with the axis of said shaft, each of said segments having an acute angle, said third segments being connected with opposite sides of a work clamping plate, said work clamping plate being movable from a position over said base plate to a vertical position substantially normal thereto, means coupling all of said segments whereby said second and third segments slide with respect to each other and with respect to said first mentioned segments in overlapping parallel planes for supporting said work clamping plate with respect to said base plate through various angular positions, and means for selectively fastening said second and third segments in a set position with respect to each other and with respect to said first segments for supporting and maintaining said work clamping plate at a selected angle with respect to said base plate.

2. A machine tool as set forth in claim 1 in which there are means mounted on said third segments and successively engageable with said first and second segments for moving said second and third segments selectively with respect to said first segments.

3. A machine tool as set forth in claim 1 in which said first and second segments are provided with peripheral teeth, the teeth on one of said last mentioned segments terminating in a position spaced from the end of the peripheral edge thereof for a distance equal to the amount of the overlap of said first and second segments in the spread position thereof, a pinion journaled on said third segment and engageable with the peripheral teeth on said first and second segments and means extending from said shaft for driving said pinion for moving said second and third segments selectively with respect to said first segments.

4. A machine tool as set forth in claim 1 in which said means coupling all of said segments consists of arcuate slots in said first and second segments formed on radii extending from the axis of said shaft as centers and selectively clamping bolts extending through said second and third segments and engageable within the slots in said first and second segments for selectively fixing said second and third segments relative to each other and with respect to said first segments.

5. A machine tool as set forth in claim 1 in which said means coupling all of said segments consists of arcuate slots in said first and second segments where the slots are formed on different radii extending from the axis of said shaft as centers and are offset one from the other and selectively clamping bolts extending through said second and third segments and engageable in the slots in said first and second segments for selectively fixing said second and third segments relative to each other and relative to said first segments.

6. A machine tool as set forth in claim 1 in which said third segment carries mounting means on the edge thereof for journaling a rotatable adjusting radial shaft, said radial shaft extending radially from said transverse shaft and connected therewith through gear means, a pinion journaled adjacent the periphery of the aforesaid third segment, gear means interconnecting the terminating end of said radial shaft with said pinion for driving said pinion, said first and second segments having teeth extending over portions of the peripheries thereof and with which said pinion is meshed and means associated with said transverse shaft for imparting movement to said second and third segments for selectively adjusting the position of said work clamping plate.

References Cited in the file of this patent

UNITED STATES PATENTS

| 1,316,221 | Conradson | Sept. 16, 1919 |
| 2,593,936 | Teetor | Apr. 22, 1952 |

FOREIGN PATENTS

| 212,686 | Switzerland | Mar. 17, 1941 |
| 719,348 | Great Britain | Dec. 1, 1954 |
| 837,197 | Germany | Apr. 21, 1952 |
| 993,147 | France | Oct. 26, 1951 |